(12) United States Patent
Takeda et al.

(10) Patent No.: US 7,180,833 B2
(45) Date of Patent: Feb. 20, 2007

(54) INFORMATION RECORDING AND/OR REPRODUCING APPARATUS

(75) Inventors: Minoru Takeda, Tokyo (JP); Masataka Shinoda, Kanagawa (JP); Shingo Imanishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 668 days.

(21) Appl. No.: 10/461,326

(22) Filed: Jun. 16, 2003

(65) Prior Publication Data

US 2004/0047270 A1 Mar. 11, 2004

(30) Foreign Application Priority Data

Jul. 1, 2002 (JP) ............................. 2002-192058

(51) Int. Cl.
*G11B 7/00* (2006.01)
(52) U.S. Cl. .............................. 369/44.23; 369/112.23; 369/112.01
(58) Field of Classification Search ..................... None
See application file for complete search history.

(56) References Cited

U.S. PATENT DOCUMENTS 6,704,096 B1 * 3/2004 Takeda et al. ........... 369/44.38
7,035,196 B2 * 4/2006 Takasuka et al. ........... 369/121

* cited by examiner

*Primary Examiner*—Muhammad Edun
(74) *Attorney, Agent, or Firm*—Oblon, Spivak, McClelland, Maier & Neustadt, P.C.

(57) ABSTRACT

An information recording and/or reproducing apparatus includes a laser light source from which a laser beam having a wavelength of from 220 nm to 280 nm exits; and a converging lens unit disposed at a nearfield area of a recording medium and upon which the laser beam from the laser light source is incident. The converging lens unit includes an objective lens and a solid immersion lens. The solid immersion lens is disposed between the objective lens and the recording medium, and is formed of a highly refractive material having a high transmittance. The information recording and/or reproducing apparatus records an information signal onto or reproduces an information signal from the recording medium by irradiating the recording medium with the laser beam from the laser light source.

16 Claims, 2 Drawing Sheets

INFORMATION RECORDING AND/OR REPRODUCING APPARATUS

BACKGROUND OF THE INVENTION

1. Field of the Invention

The present invention relates to an information recording and/or reproducing apparatus and an optical pickup device. More particularly, the present invention relates to an information recording and/or reproducing apparatus and an optical pickup device, each of which uses a solid immersion lens.

2. Description of the Related Art

In order to read digital signal information from and write digital signal information onto a related optical recording medium, such as a digital versatile disc (DVD), an optical pickup device comprising a semiconductor laser and an objective lens as main components is used. The digital signal information is stored in the form of fine pits on the disc. The semiconductor laser emits laser beams having wavelengths in the visible range. The objective lens has a predetermined numerical aperture. For example, when a DVD-ROM (read-only-memory) having a recording capacity of 4.7 GByte is used, laser beams are converged on an information recording surface of the disc, using a red semiconductor laser, which emits light having a wavelength of 650 nm, and an objective lens having a numerical aperture (NA) of 0.6; and changes with time in the strength of detection of returning light reflected from the information recording surface is converted into an RF signal waveform in order to reproduce information recorded on the disc. A DVD-ROM disc has a plurality of pits formed with a depth of approximately 110 nm and a track-pitch interval of 0.74 μm. A pit length and an interval from one pit to a succeeding pit are from a minimum of 0.4 μm to 1.47 μm. The DVD-ROM disc has spiral tracks.

In recent years, for a laser light source of an optical pickup device, a GaN semiconductor lasers (LD) which oscillates at wavelengths from the blue light range to the ultraviolet range has been rapidly developed. An attempt is being made to use such a GaN semiconductor laser in a next-generation optical disc system for a DVD.

A practical shortest oscillation wavelength of a GaN semiconductor laser is approximately 350 nm. Due to a band gap that is determined by a material used, it is difficult to make the wavelength shorter than this. It is expected that an objective lens having an NA of approximately 0.85 that is much higher than the NA of an objective lens based on a DVD standard or used in a recording and/or reproducing apparatus based on the DVD standard will be used in the next-generation optical disc system. In this way, in recent years, the use of an objective lens having an NA as high as that of a microscope in the next-generation optical disc system is being considered. However, as long as an objective lens is used in a recording and/or reproducing system in what is called a far field optical system that is similar to a related optical system, there is a limit as to how high the NA can be made, which is approximately 0.95.

With the rapid development of information communication and image processing technologies in recent years, in the future, an optical disc will be required to have a sub-terabyte storage capacity like that of a hard disc (HDD) whose storage capacity has been considerably increased in recent years. Here, a method for realizing a high recording density and high storage capacity in an optical recording medium having, for example, the same size and recording mode as a DVD is considered.

For an optical pickup device comprising a GaN semiconductor having a shortest oscillation wavelength of approximately 350 nm (mentioned above) and an objective lens having a maximum NA of approximately 0.95 (mentioned above), when a simple proportional calculation based on parameters of a DVD optical pickup device is carried out, a recordable/reproducible density (capacity) of an optical disc, serving as an optical recording medium, is: $((650 \text{ nm}/350 \text{ nm}) \times (0.95/0.6))^2 \times 4.7 \text{ GByte} = 41 \text{ GByte}$ Therefore, as long as such an optical pickup device is used, when, for example, a DVD of the same size and recording mode is used, a recording capacity of approximately only 41 GByte for a single layer can only be obtained. Consequently, it is difficult to achieve the object of increasing the recording density and storage capacity of an optical recording medium with the rapid development of information communication and image processing technologies in recent years.

SUMMARY OF THE INVENTION

Accordingly, it is an object of the present invention to provide an information recording and/or reproducing apparatus which resolves the above-mentioned problem.

It is another object of the present invention to provide an optical pickup device which resolves the above-mentioned problem.

According to the present invention, there is provided an information recording and/or reproducing apparatus including a laser light source and a converging lens unit. A laser beam having a wavelength of from 220 nm to 280 nm exits from the laser light source. The converging lens unit is disposed at a nearfield area of a recording medium and the laser beam from the laser light source is incident thereupon. The converging lens unit includes an objective lens and a solid immersion lens. The solid immersion lens is disposed between the objective lens and the recording medium, and is formed of a highly refractive material having a high transmittance. The information recording and/or reproducing apparatus records an information signal onto or reproduces an information signal from the recording medium by irradiating the recording medium with the laser beam from the laser light source.

According to the present invention, there is provided an optical pickup device including a laser light source and a converging lens unit. A laser beam having a wavelength of from 220 nm to 280 nm exits from the laser light source. The converging lens unit is disposed at a nearfield area of a recording medium and the laser beam from the laser light source is incident thereupon. The converging lens unit includes an objective lens and a solid immersion lens. The solid immersion lens is disposed between the objective lens and the recording medium, and is formed of a highly refractive material having a high transmittance.

DESCRIPTION OF THE PREFERRED EMBODIMENT

Figure 1:
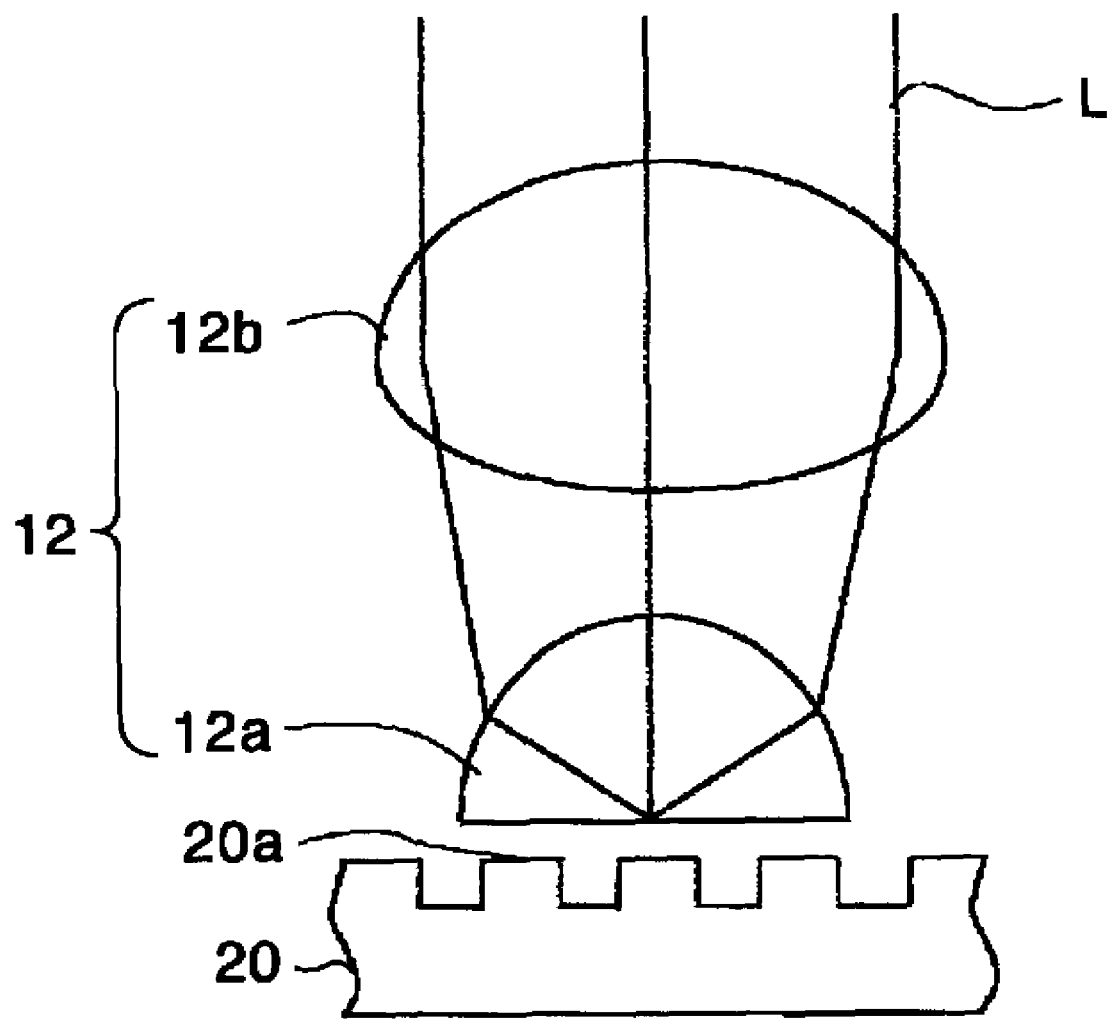
FIG. 1 is an enlarged sectional view of a structure of a converging lens unit, which comprises two lenses, of an information recording and/or reproducing apparatus of the present invention.
Figure 2:
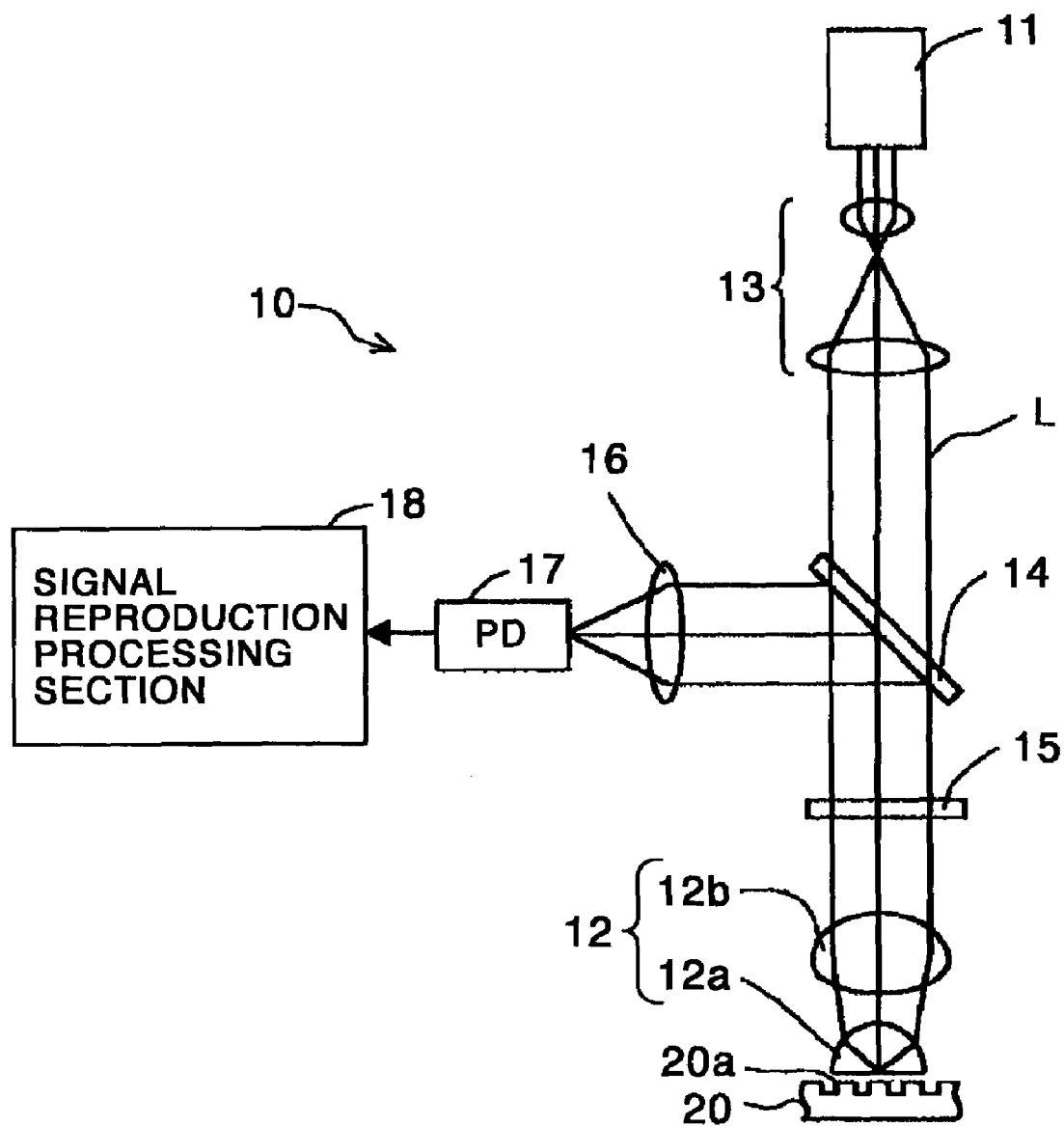
FIG. 2 is a schematic view of a structure of the information recording and/or reproducing apparatus of the present invention.

Hereunder, a detailed description of the present invention will be given with reference to the drawings. FIG. 1 illustrates a structure of a converging lens unit, which comprises two lenses, used in an information recording and/or reproducing apparatus of the present invention. FIG. 2 is a schematic view of a structure of the information recording and/or reproducing apparatus using the converging lens unit shown in FIG. 1.

An information recording and/or reproducing apparatus 10 records an information signal onto and reproduces an information signal from a signal recording surface 20a of an optical recording medium 20, such as an optical disc, by making use of nearfield light. In the information recording and/or reproducing apparatus 10, the optical recording medium 20 having a high recording density and a high storage capacity and having, for example, the same size as a DVD (a diameter of approximately 120 mm) and the same recording mode as the DVD has a storage capacity of 100 GByte for a single recording layer. The information recording and/or reproducing apparatus of the present invention can record an information signal onto and/or reproduce an information signal from the optical recording medium 20 having a high recording density that is approximately 21 times that of a currently used DVD.

As shown in FIG. 2, the information recording and/or reproducing apparatus 10 comprises an optical pickup device and a signal reproduction processing section 18. The optical pickup device comprises a laser light source 11, a converging lens unit 12, an expander lens unit 13, a polarization beam splitter (PBS) 14, a quarter wave plate (QWP) 15, a condenser lens 16, and a photodetector (PD) 17. An output signal from the photodetector 17 is supplied to the signal reproduction processing section 18.

The laser light source 11 emits an information recording or reproduction laser beam L. The wavelength of the recording or reproduction laser beam L emitted from the laser light source 11 is short and is in, for example, the deep ultraviolet (UV) range of from 220 nm to 280 nm.

The laser light source 11 is, for example, a semiconductor laser using diamond as a light-emitting material. The diamond semiconductor laser oscillates at a wavelength near 235 nm, has a large band gap, and a high transmittance with respect to even deep ultraviolet wavelengths.

The laser light source 11 may also be, for example, a fourth-harmonic YAG laser 4. The fourth-harmonic YAG laser 4 is a solid laser having an oscillation wavelength near 266 nm, is compact, and has a low power consumption.

As shown in FIG. 1, the converging lens unit 12 comprises two lenses, that is, a solid immersion lens (SIL) 12a and an objective lens 12b. The SIL 12a is a front lens and the objective lens 12b is a rear lens. Here, the front lens is a converging lens disposed nearer the optical recording medium 20 than the rear lens, whereas the rear lens is a converging lens disposed further away from the optical recording medium 20 than the front lens. The converging lens unit 12 is an optical system having an effective NA equal to or greater than 1 and making use of nearfield light.

For example, in order to make it possible for the optical recording medium 20 to have a storage capacity of 100 GByte, when the wavelength of the recording or reproduction laser beam L is, for example, 235 nm, the NA of the converging lens unit 12 is at least 1.0, which is obtained by carrying out a simple proportional calculation based on parameters of the DVD optical pickup device (oscillation wavelength of the laser light source is 650 nm, and the NA of the converging lens unit 12 is 0.60). When the wavelength of the recording or reproduction laser beam L is, for example, 266 nm, the NA of the converging lens unit 12 is at least 1.13.

The SIL 12a has a semicircular shape or an ultra-semicircular shape, and has a high refractive index and a high transmittance. Here, the term "ultra-semicircular shape" refers to a shape of one of the two divided portions that includes the center of a sphere divided by cutting it with a plane not including the center of the sphere. The SIL 12a is disposed so that the front end surface (that is, the bottom-most end surface opposite to the spherical surface) faces the signal recording surface 20a of the optical recording medium 20. By decreasing the distance between the front end surface of the SIL 12a and the signal recording surface 20a of the optical recording medium 20 up to an area where nearfield light is generated (nearfield area), an information signal is recorded onto or reproduced from the optical recording medium 20.

The SIL 12a is formed of, for example, a highly refractive and a highly transmissive material, such as diamond or hafnium oxide ($HfO_2$). When, for example, a semicircular lens formed of a noncrystalline diamond material is used as the SIL 12a, a precisely ground diamond ball lens is cut to a suitable length.

When, for example, the SIL 12a is formed of diamond and the wavelength of the recording or reproduction laser beam L is near 235 nm, the SIL 12a has a refractive index of approximately 2.65, and a transmittance of approximately 63.3%.

When, for example, the SIL 12a is formed of diamond and the wavelength of the recording or reproduction laser beam L is near 266 nm, the SIL 12a has a refractive index of approximately 2.57, and a transmittance of approximately 64.7%.

When, for example, the SIL 12a is formed of hafnium oxide and the wavelength of the recording or reproduction laser beam L is near 235 nm, the SIL 12a has a refractive index of approximately 2.17, and a transmittance of approximately 74.2%.

When, for example, the SIL 12a is formed of hafnium oxide and the wavelength of the recording or reproduction laser beam L is near 266 nm, the SIL 12a has a refractive index of approximately 2.11, and a transmittance of approximately 75.7%.

Although the objective lens 12b may be formed so that at least one of its surfaces is aspherical, the objective lens 12b shown in FIG. 1 is formed by molding so that both surfaces are aspherical. The objective lens 12b is formed of, for example, a glass material.

The NA of the objective lens 12b depends upon the refractive index of the SIL 12a. When, for example, the SIL 12a is semicircular and is formed of diamond, and the wavelength of the recording or reproduction laser beam L is near 235 nm, the NA of the objective lens 12b is 0.4. When the NA of the objective lens 12b is 0.4, the refractive index of the SIL 12a is approximately 2.65. Since 0.4×2.65=1.06, the NA of the entire converging lens unit 12 is at least 1.0.

When, for example, the SIL 12a is semicircular and is formed of diamond, and the wavelength of the recording or reproduction laser beam L is near 266 nm, the NA of the objective lens 12b is approximately 0.44. When the NA of the objective lens 12b is approximately 0.44, the refractive index of the SIL 12a is approximately 2.57. Since 0.44×2.57=1.13, the NA of the entire converging lens unit 12 is at least 1.13.

When, for example, the SIL 12a is semicircular and is formed of hafnium oxide, and the wavelength of the recording or reproduction laser beam L is near 235 nm, the NA of the objective lens 12b is approximately 0.47. When the NA of the objective lens 12b is approximately 0.47, the refractive index of the SIL 12a is approximately 2.17. Since 0.47×2.17=1.02, the NA of the entire converging lens unit 12 is at least 1.0.

When, for example, the SIL 12a is semicircular and is formed of hafnium oxide, and the wavelength of the recording or reproduction laser beam L is near 266 nm, the NA of the objective lens 12b is approximately 0.54. When the NA of the objective lens 12b is approximately 0.54, the refractive index of the SIL 12a is approximately 2.11. Since 0.54×2.11=1.14, the NA of the entire converging lens unit 12 is at least 1.13.

When the SIL 12a has an ultra-semicircular shape, and the refractive index of the SIL 12a with respect to the wavelength of the recording or reproduction laser beam L is n, the NA of the entire converging lens unit 12 can be determined by the formula: numerical aperture (NA) of the objective lens $12a \times n^2$. Accordingly, the NA is increased compared to the NA of the semicircular SIL 12a.

When, for example, the ultra-semicircular SIL 12a is formed of diamond, and the wavelength of the recording or reproduction laser beam L is near 235 nm, the NA of the objective lens 12b is approximately 0.15. When the NA of the objective lens 12b is approximately 0.15, the refractive index of the SIL 12a is approximately 2.65. Since, by simple calculation, $0.15 \times 2.65^2 = 1.05$, the NA of the entire converging lens unit 12 is at least 1.0.

When, for example, the SIL 12a has an ultra-semicircular shape and is formed of diamond, and the wavelength of the recording or reproduction laser beam L is near 266 nm, the NA of the objective lens 12b is approximately 0.18. When the NA of the objective lens 12b is approximately 0.18, the refractive index of the SIL 12a is approximately 2.57. Since $0.18 \times 2.57^2 = 1.19$, the NA of the entire converging lens unit 12 is at least 1.13.

When, for example, the SIL 12a has an ultra-semicircular shape and is formed of hafnium oxide, and the wavelength of the recording or reproduction laser beam L is near 235 nm, the NA of the objective lens 12b is approximately 0.22. When the NA of the objective lens 12b is approximately 0.22, the refractive index of the SIL 12a is approximately 2.17. Since $0.22 \times 2.17^2 = 1.04$, the NA of the entire converging lens unit 12 is at least 1.0.

When, for example, the SIL 12a has an ultra-semicircular shape and is formed of hafnium oxide, and the wavelength of the recording or reproduction laser beam L is near 266 nm, the NA of the objective lens 12b is approximately 0.26. When the NA of the objective lens 12b is approximately 0.26, the refractive index of the SIL 12a is approximately 2.11. Since $0.26 \times 2.11^2 = 1.16$, the NA of the entire converging lens unit 12 is at least 1.13.

The pits of the optical recording medium 20 subjected to an information signal recording or reproducing operation by the information recording and/or reproducing apparatus 1, having the same size and recording mode as, for example, a DVD, and having a storage capacity of 100 GByte for a single recording layer are disposed with a track pitch of approximately 160 nm and have a minimum length of approximately 86 nm, which are determined by a simple proportional calculation based on the aforementioned DVD optical pickup device.

With a cutting device utilizing an ultraviolet (UV) laser that is used when producing a DVD and that emits light with a wavelength near 350 nm, such fine pits cannot be formed. Therefore, such fine pits are formed with a cutting device using an electron beam that is converged to a diameter of approximately 60 nm instead of an ultraviolet laser beam.

In order to reproduce an information signal from the signal recording surface 20a of the optical recording medium 20 with the information recording and/or reproducing apparatus 10 using nearfield light, the reproduction laser beam L having a wavelength in the range of from 220 nm to 280 nm, which is in the deep ultraviolet range, is emitted from the laser light source 11. The diameter of the reproduction laser beam L is increased by the expander lens unit 13 and the expanded reproduction laser beam L is transmitted through the PBS 14. The reproduction laser beam L transmitted through the PBS 14 is transmitted through the quarter wave plate 15. The reproduction laser beam L transmitted through the quarter wave plate 15 is incident upon the objective lens 12b and the SIL 12a of the converging lens unit 12 having an effective NA of at least 1. A gap controlling device (not shown) or the like disposed at the information recording and/or reproducing apparatus 10 controls the distance between the front end surface of the SIL 12a and the signal recording surface 20a of the optical recording medium 20 so that it becomes a certain value that allows generation of nearfield light. By this, the reproduction laser beam L gathered on the front end surface of the SIL 12a moves out therefrom. The reproduction laser beam L is formed into a spot by being focused on the signal recording surface 20a of the optical recording medium 20. Returning light reflected from the signal recording surface 20a of the optical recording medium 20 is transmitted through the SIL 12a, the objective lens 12b, and the quarter wave plate 15, and impinges upon the PBS 14. The returning light is reflected by the PBS 14, impinges upon the condenser lens 16, and is focused on the PD 17 by the condenser lens 16. The PD 17 detects the intensity of the returning light, and outputs an electrical signal as an output signal in accordance with the intensity of the returning light. The output signal from the PD 17 is input to the signal reproduction processing section 18, and reproduces a read signal from the optical recording medium 20.

In order to record an information signal onto the signal recording surface 20a of the optical recording medium 20 with the information recording and/or reproducing apparatus 10 using nearfield light, the recording laser beam L having a wavelength in the range of from 220 nm to 280 nm, which is in the deep ultraviolet range, is emitted from the laser light source 11. The diameter of the recording laser beam L is increased by the expander lens unit 13 and the expanded recording laser beam L is transmitted through the PBS 14. The recording laser beam L transmitted through the PBS 14 is transmitted through the quarter wave plate 15. The recording laser beam L transmitted through the quarter wave plate 15 is incident upon the objective lens 12b and the SIL 12a of the converging lens unit 12 having an effective NA of at least 1. The gap controlling device (not shown) or the like disposed at the information recording and/or reproducing apparatus 10 controls the distance between the front end surface of the SIL 12a and the signal recording surface 20a of the optical recording medium 20 so that it becomes a certain value that allows generation of nearfield light. By this, the recording laser beam L gathered on the front end surface of the SIL 12a moves out therefrom. The recording laser beam L is formed into a spot by being focused on the signal recording surface 20a of the optical recording medium 20. By this, the information signal is recorded onto the signal recording surface 20a of the optical recording medium 20.

In the information recording and/or reproducing apparatus of the present invention, information is recorded onto or reproduced from the optical recording medium 20 using the recording or reproduction laser beam L emitted from the laser light source 11 and having a short wavelength in the range of from 220 nm to 280 nm, which is in the deep ultraviolet range; and the recording or reproduction laser beam L is focused on the optical recording medium 20 by the converging lens unit 12 having an effective NA of at least 1 and comprising the SIL 12a formed of a material, such as diamond or hafnium oxide, having a high refractive index and a high transmittance, so that the spot diameter on the signal recording surface 20a of the optical recording medium 20 can be made small.

Therefore, it is possible to record an information signal onto or reproduce an information signal from the optical recording medium 20 having a high recording density and a high storage capacity. For example, it is possible to record an information signal onto or reproduce an information signal from the optical recording medium having the same size and recording mode as a DVD, having a storage capacity of 100 GByte for a single recording layer, and having a high recording density that is approximately 21 times the recording density of a currently used DVD.

In the embodiment, since the SIL 12a of the converging lens unit 12 is formed of, for example, diamond or hafnium oxide having a high refractive index and a high transmittance, it is possible to make the NA of the objective lens 12b, which forms the converging lens unit 12 along with the SIL 12a, small. Therefore, the objective lens 12b is easy to produce, and can be formed with higher precision.

In the present invention, when the SIL 12a has an ultra-semicircular shape, the NA of the entire converging lens unit 12 is increased, so that it is possible to record an information signal onto or reproduce an information signal from the optical recording medium 20 having a higher recording density and storage capacity. By forming the SIL 12a with an ultra-semicircular shape, the NA of the objective lens 12b can be made even smaller. Therefore, the objective lens 12b is easy to produce, and can be formed with higher precision.

Although the present invention is described with reference to one embodiment, the present invention is not limited thereto, so that various modifications may be made. For example, although, in the embodiment, the optical recording medium 20 having the same size and recording mode as, for example, a DVD, and having a storage capacity of 100 GByte for a single recording layer is subjected to an information signal recording or reproducing operation by the information recording and/or reproducing apparatus 1, an optical recording medium 20 having a higher recording density and storage capacity may be subjected to an information signal recording or reproducing operation, for example, by using a laser light source whose exiting recording or reproduction laser beam L has a shorter wavelength or by further increasing the NA of the objective lens 12b.

What is claimed is:

1. An information recording and/or reproducing apparatus comprising:
    a laser light source from which a laser beam having a wavelength of from 220 nm to 280 nm exits; and
    a converging lens unit disposed at a nearfield area of a recording medium and upon which the laser beam from the laser light source is incident, the converging lens unit including an objective lens and a solid immersion lens, the solid immersion lens being disposed between the objective lens and the recording medium, the solid immersion lens being formed of a highly refractive material having a high transmittance,
    wherein an information signal is recorded onto or reproduced from the recording medium by irradiating the recording medium with the laser beam from the laser light source and wherein the solid immersion lens is formed of one of diamond and hafnium oxide.

2. An information recording and/or reproducing apparatus according to claim 1, wherein the solid immersion lens is formed of diamond and has a semicircular shape.

3. An information recording and/or reproducing apparatus according to claim 1, wherein the solid immersion lens is formed of diamond and has an ultra-semicircular shape.

4. An information recording and/or reproducing apparatus according to claim 1, wherein the solid immersion lens is formed of hafnium oxide and has a semicircular shape.

5. An information recording and/or reproducing apparatus according to claim 1, wherein the solid immersion lens is formed of hafnium oxide and has an ultra-semicircular shape.

6. An information recording and/or reproducing apparatus according to claim 1, wherein at least one of the surfaces of the objective lens is an aspherical surface.

7. An information recording and/or reproducing apparatus according to claim 1, wherein the laser light source is a diamond semiconductor laser using diamond as a light-emitting material.

8. An optical pickup device comprising:
    a laser light source from which a laser beam having a wavelength of from 220 nm to 280 nm exits; and
    a converging lens unit disposed at a nearfield area of a recording medium and upon which the laser beam from the laser light source is incident, the converging lens unit including an objective lens and a solid immersion lens, the solid immersion lens being disposed between the objective lens and the recording medium, the solid immersion lens being formed of a highly refractive material having a high transmittance,
    wherein the solid immersion lens is formed of one of diamond and hafnium oxide.

9. An optical pickup device according to claim 8, wherein the solid immersion lens is formed of diamond and has a semicircular shape.

10. An optical pickup device according to claim 8, wherein the solid immersion lens is formed of diamond and has an ultra-semicircular shape.

11. An optical pickup device according to claim 8, wherein the solid immersion lens is formed of hafnium oxide and has a semicircular shape.

12. An optical pickup device according to claim 8, wherein the solid immersion lens is formed of hafnium oxide and has an ultra-semicircular shape.

13. An optical pickup device according to claim 8, wherein at least one of the surfaces of the objective lens is an aspherical surface.

14. An optical pickup device according to claim 8, wherein the laser light source is a diamond semiconductor laser using diamond as a light-emitting material.

15. An information recording and/or reproducing apparatus comprising:
    a laser light source from which a laser beam having a wavelength of from 220 nm to 280 nm exits; and
    a converging lens unit disposed at a nearfield area of a recording medium and upon which the laser beam from the laser light source is incident, the converging lens unit including an objective lens and a solid immersion lens, the solid immersion lens being disposed between the objective lens and the recording medium, the solid immersion lens being formed of a highly refractive material having a high transmittance, wherein an information signal is recorded onto or reproduced from the recording medium by irradiating the recording medium with the laser beam from the laser light source and wherein the solid immersion lens is formed of diamond.

16. An optical pickup device comprising:

a laser light source from which a laser beam having a wavelength of from 220 nm to 280 nm exits; and a converging lens unit disposed at a nearfield area of a recording medium and upon which the laser beam from the laser light source is incident, the converging lens unit including an objective lens and a solid immersion lens, the solid immersion lens being disposed between the objective lens and the recording medium, the solid immersion lens being formed of a highly refractive material having a high transmittance, wherein the solid immersion lens is formed of hafnium oxide.

* * * * *